United States Patent [19]

Yonei et al.

[11] Patent Number: 4,980,587

[45] Date of Patent: Dec. 25, 1990

[54] SPINDLE MOTOR WITH PRECISION BEARINGS

[75] Inventors: Hiroyuki Yonei, Echi; Yoshito Oku, Youkaichi; Susumu Terada, Hikone, all of Japan

[73] Assignee: Nippon Densan Corporation, Kyoto, Japan

[21] Appl. No.: 361,557

[22] Filed: Jun. 5, 1989

[30] Foreign Application Priority Data

Aug. 24, 1988 [JP] Japan ................... 63-210025

[51] Int. Cl.$^5$ ..................... H02K 5/16; F16C 35/067
[52] U.S. Cl. ................... 310/67 R; 310/90; 384/551; 384/585
[58] Field of Search ........... 310/67 R, 90, 261, 268; 360/98.06, 98.07; 384/537, 551, 585

[56] References Cited

U.S. PATENT DOCUMENTS

| | | | |
|---|---|---|---|
| 2,804,359 | 8/1957 | Chauvel | 384/585 |
| 4,480,881 | 11/1984 | Fujimori | 310/90 |
| 4,519,010 | 5/1985 | Elsaesser . | |
| 4,607,182 | 8/1986 | Ballhaus | 310/90 |
| 4,612,468 | 9/1986 | Stürm et al. | 310/90 |
| 4,752,847 | 6/1988 | Harris | 360/133 |
| 4,900,958 | 2/1990 | Kitahara et al. | 310/67 R |

FOREIGN PATENT DOCUMENTS 165828 10/1949 Austria .
3404466 8/1985 Fed. Rep. of Germany .

Primary Examiner—Steven L. Stephan
Assistant Examiner—D. L. Rebsch
Attorney, Agent, or Firm—William H. Eilberg

[57] ABSTRACT

A spindle motor comprises a central shaft, a hub rotatable about the shaft and having a central bore which is open at one end, a first bearing fitted in the bore to surround the shaft, a second bearing disposed within the bore to surround the shaft and axially spaced from the first bearing to be positioned closer to the open end of the bore, and an auxiliary bush fitted in the bore to fittingly receive the second bearing. The bush has an inward flange axially interposed between the first and second bearings. The flange provides a first surface in face-to-face contact with an outer race of the first bearing. The flange further provides a second surface parallel to the first surface and in face-to-face contact with an outer race of the second bearing.

6 Claims, 5 Drawing Sheets

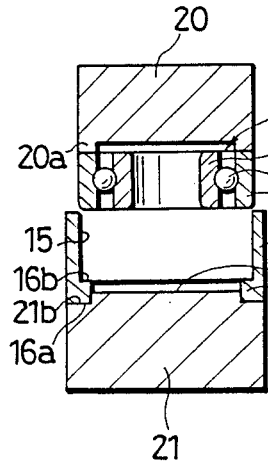
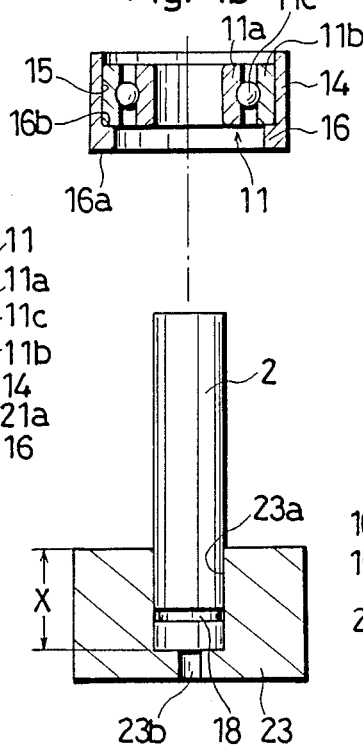
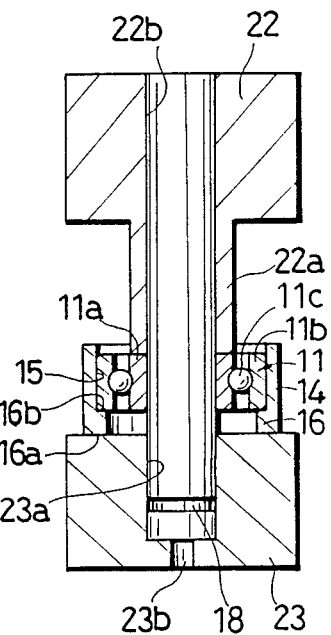
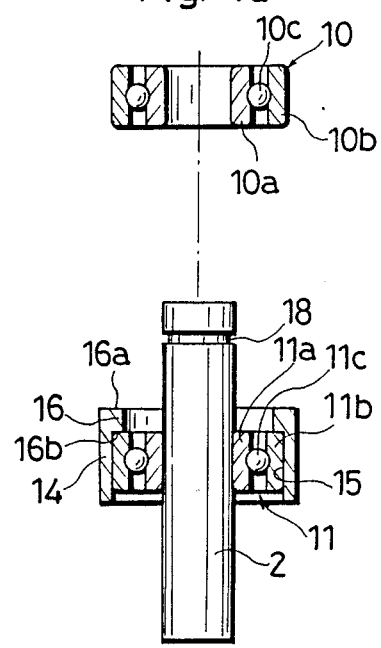
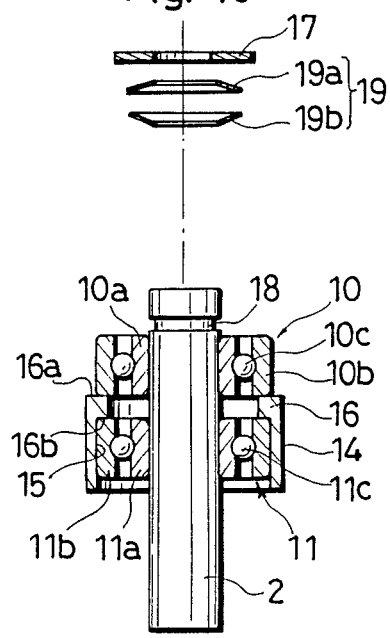

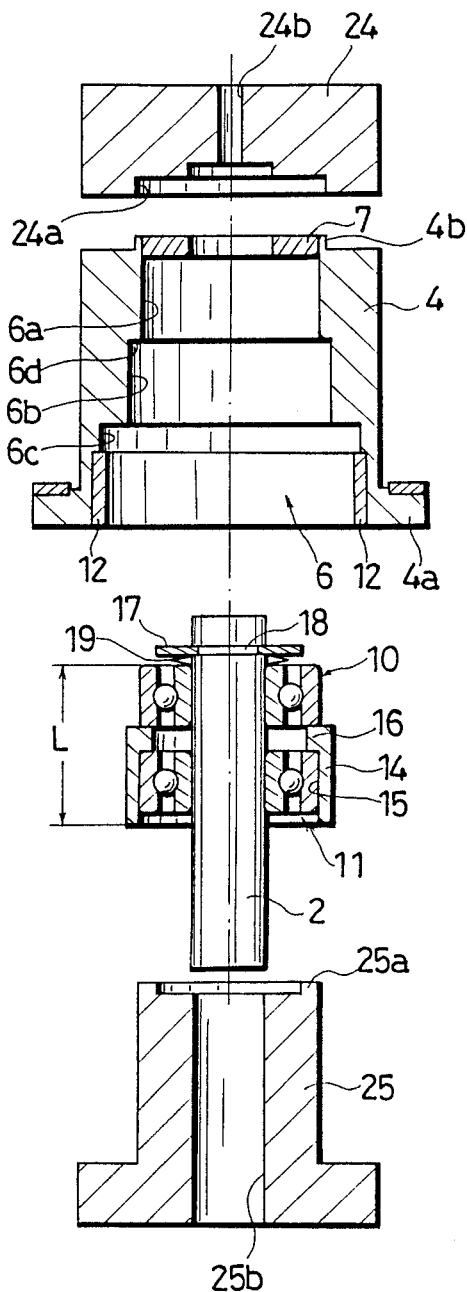
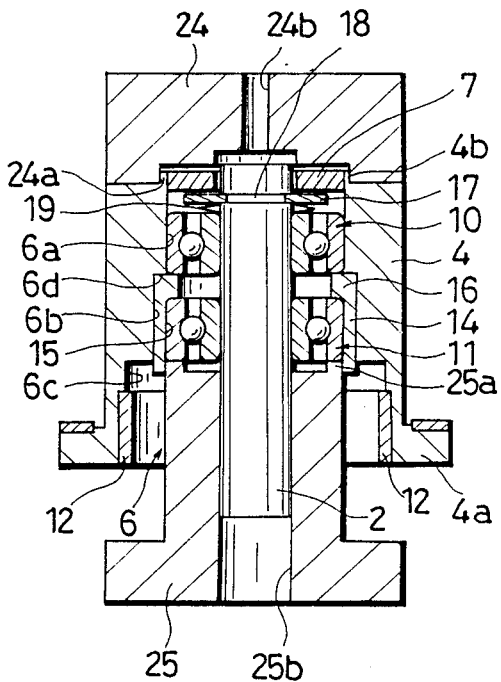

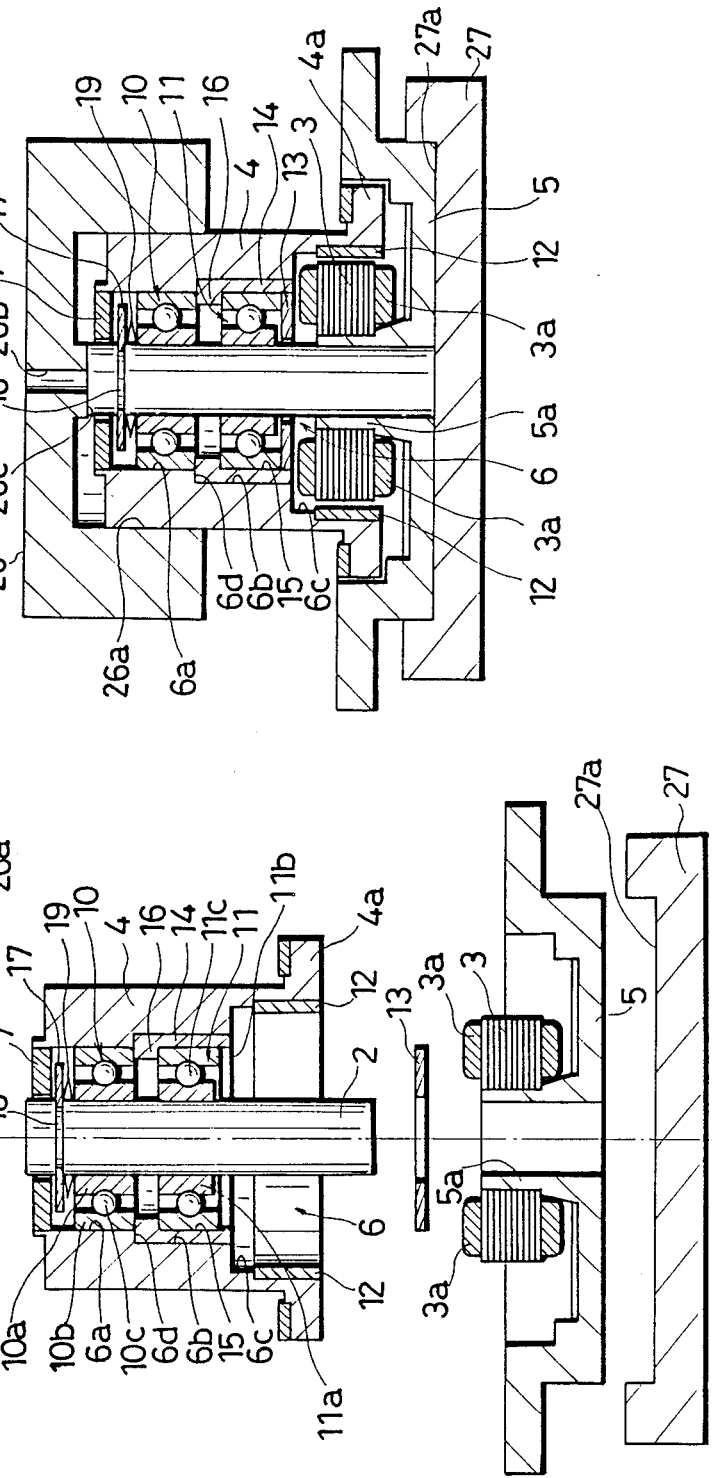

SPINDLE MOTOR WITH PRECISION BEARINGS

BACKGROUND OF THE INVENTION

1. Field of the Invention

This invention relates to a spindle motor of the type in which a rotor or hub for supporting data carrier discs is rotatably supported on a central shaft by means of a pair of bearings. It also relates to a method of making or assembling such a motor.

2. Description of the Prior Art

As is well known, spindle motors are often used to drive magnetic data storage discs to write in or read out data by the aid of a magnetic read-write head. Obviously, such a motor is required to rotate as precisely controlled because otherwise the magnetic head may not be brought to an appropriate position relative to each disc for writing or reading. However, since the spindle motor is an assembly of various small parts, assembling or mounting errors will sometimes result, thereby failing to provide accurately controlled rotation. Such a problem becomes particularly serious in the case of mounting errors with respect to bearings.

To more clearly explain the problem described above, reference is now made to FIGS. 7 and 8 of the accompanying drawings which show a typical arrangement of a prior art spindle motor.

As shown in FIG. 7, the prior art spindle motor comprises a central shaft 100 fixed to a central boss portion 101a of a mount bracket 101. A hub or rotor 102 for drivingly supporting one or more magnetic discs (not shown) is rotatably supported on the central shaft by means of a pair of axially spaced ball bearings 103, 104 which are press-fitted in a central bore 102a of the hub. The central bore 102a is substantially closed by a closure ring 105. A stator 106 fixed on the bracket boss portion 101a cooperates with a plurality of rotor magnets 107 mounted on the hub 102 to rotate the hub relative to the shaft.

For assembly, the bearings 103, 104 are separately inserted into the central bore 102a of the hub 102 from above, as illustrated in FIG. 8. Thereafter, the shaft 100 is inserted through the bearings to be fitted into the boss portion 101a of the mount bracket 100 (FIG. 7), and the remaining parts are mounted in place.

As can be easily appreciated, the most important step of the assembling operation is the press-fitting of the bearings 103, 104 because improper mounting of these parts directly results in rotational deflection or vibration of the hub 102. In fact, however, one or both of the bearings are sometimes press-fitted improperly, as indicated in phantom lines in FIG. 8. This is due to the fact that the individual bearings, which themselves are very small parts, have a small axial length (thickness).

Generally, it is easy to properly press-fit a long cylinder for example into a corresponding bore because the cylinder, even if improperly oriented (e.g. the axis of the cylinder forming a slight angle relative to that of the bore) at the initial stage of insertion, will be corrected in orientation upon subsequent insertion. Therefore, mounting errors are unlikely to occur in press-fitting such a long body. However, the situation is quite different when inserting a thin coin coaxially into a corresponding bore, in which case the coin is very likely to be press-fitted in an inclined condition.

The bearing for the spindle motor is very thin (small in axial length), so that it may be roughly regarded as similar to the coin. For this reason, the bearing is sometimes mounted in an inclined condition, as shown in FIG. 8.

When one bearing is improperly press-fitted, it is not coaxial with the other bearing, consequently resulting in rotational deflection of the hub which causes writing or reading errors. Further, such improper mounting of the bearing also hinders smooth rotation of the hub in addition to damaging some rotational parts. Although it is possible to subsequently conduct positional correction of the improperly mounted bearing, such an operation is time-taking but yet fails to provide intended correction due to previous damaging or deformation of the bearing or the bore receiving it.

SUMMARY OF THE INVENTION

It is, therefore, an object of the present invention to provide a spindle motor in which the bearings thereof can be precisely mounted.

Another object of the present invention is to provide a spindle motor which can be assembled easily without damaging the bearings or their related parts.

A further object of the invention is to provide a method of making or assembling a spindle motor with high precision.

According to the present invention, there is provided a spindle motor comprising: a central shaft; a hub rotatable about the shaft, the hub having a central bore which is open at one end; means for drivingly rotating the hub about the shaft; a first bearing fitted in the bore to surround the shaft; a second bearing disposed within the bore to surround the shaft and axially spaced from the first bearing to be positioned closer to the open end of the bore; and an auxiliary bush fitted in the bore and defining a mounting space in which the second bearing is fitted, the bush having a radial inward flange axially interposed between the first and second bearings, the flange providing a first abutment surface in face-to-face contact with an outer race of the first bearing, the flange further providing a second abutment surface parallel to the first abutment surface and in face-to-face contact with an outer race of the second bearing.

The present invention also provides a method of making the above spindle motor which comprises the steps of: preparing a preassembled unit in which the first bearing, the second bearing and the auxiliary bush are mounted on the central shaft to assume respective final positions relative to the central shaft; and inserting the preassembled unit into the central bore of the hub.

Other objects, features and advantages of the invention will be fully understood from the following detailed description given with reference to the accompanying drawings.

BRIEF DESCRIPTION OF THE DRAWINGS

In the accompanying drawings:

FIGS. 4a to 4e are views showing successive stages of forming the preassembled unit shown in FIG. 3;

FIGS. 5a and 5b are views showing the step of mounting the preassembled unit of FIG. 3 to a hub of the spindle motor;

FIGS. 6a and 6b are views showing the final step of assembling the spindle motor;

DETAILED DESCRIPTION

Figure 1:
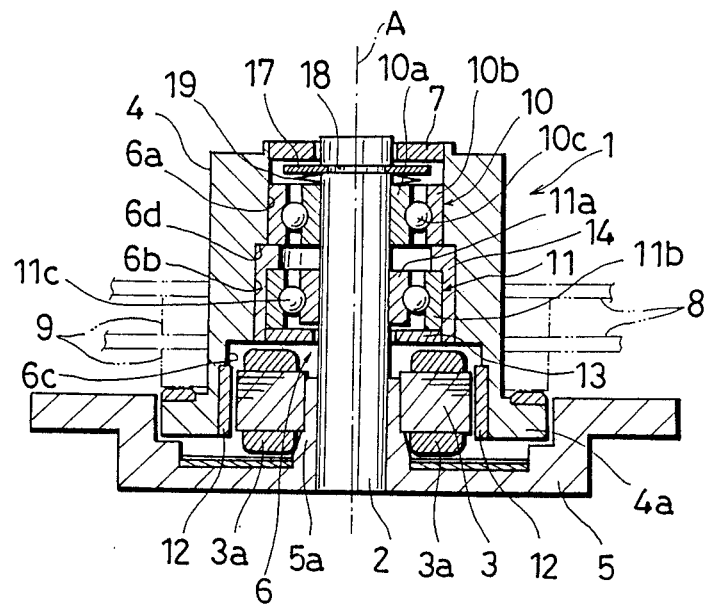
FIG. 1 is a front view, in vertical section, showing a spindle motor embodying the present invention.

Referring now to FIG. 1 of the accompanying drawings, there is illustrated a spindle motor generally represented by reference numeral 1. The spindle motor mainly comprises fixed central shaft 2, a stator 3 nonrotatable relative to the central shaft, and a rotor or hub 4 rotatably mounted on the central shaft.

The central shaft 2 is fixed to a mount bracket 5 which in turn is fixed to a stationary part (not shown) of the device or apparatus incorporating the motor. Specifically, the mount bracket 5 has a central boss portion 5a in which the shaft 2 is rigidly fitted. The stator 3 is rigidly mounted around the boss portion 5a of the bracket and has plural windings 3a which, when energized successively, generate a rotating magnetic field.

The hub 4 is generally cylindrical and has a stepped central bore 6 which is substantially closed at one end by a closure ring 7 fitted therein but held open at the other end. The opening end of the hub is integrally formed with an annular end flange 4a extending radially outward. One or more magnetic (or optical) discs 8 each having a central bore are fitted around the hub to be supported on the end flange 4a as spaced apart by means of one or more spacers 9.

According to the illustrated example, the stepped central bore 6 of the hub 4 is provided by first to third bore portions 6a-6c which increase in diameter in the mentioned order. The first bore portion 6a is located adjacent the closure ring 7 to receive a first bearing 10 which includes an annular series of balls 10c interposed between an inner race 10a and an outer race 10b. The second bore portion 6b is located at an axially intermediate position of the hub to receive a second bearing 11 which comprises another annular series of balls 11c interposed between an inner race 11a and an outer race 11b. Thus, the hub 4 is rendered rotatable relative to the central shaft 2 by means of the two bearings 10, 11. The first and second bore portions are separated by an annular shoulder 6d for the purpose to be described later.

The third bore portion 6c of the hub 4 is located at the opening end of the hub to accommodate the stator 3. Further, the hub is internally provided at the third bore portion with a plurality of rotor magnets 12 to surround the stator 3. Thus, the hub is electromagnetically rotated by the rotating magnetic field produced upon energization of the stator windings 3a.

In a known manner, the outer race 11b of the second bearing 11 carries an annular sealing ring 13 to prevent leakage of lubricating grease (not shown) from the side of the second bearing 11. Further, the closure ring 7 described previously serves to prevent leakage of lubricating grease from the side of the first bearing 10.

Figure 2:
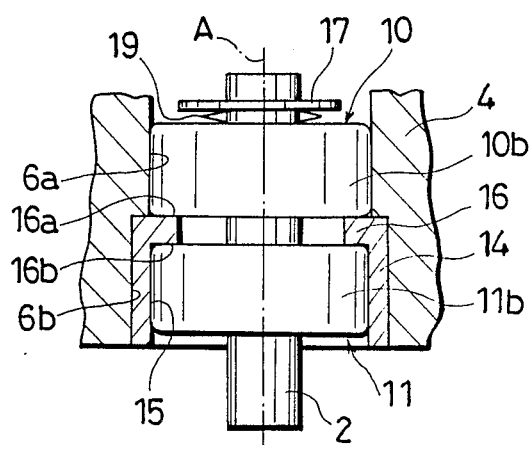
FIG. 2 is an enlarged fragmentary front view showing a principal portion of the spindle motor shown in FIG. 1.

According to the present invention, the second bearing 11 is mounted in the second bore portion 6b of the hub 4 indirectly by means of an auxiliary bush 14 press-fitted in the second bore portion. As better illustrated in FIG. 2, this auxiliary bush internally provides a mounting space 15 for the second bearing 11, and is integrally formed at one end thereof close to the first bearing 10 with a radial inward flange 16 which serves to determine the positional relation between the two bearings 10, 11, as more clearly described hereinafter.

The inward flange 16 of the auxiliary bush 14 provides a first abutment surface 16a axially coming into face-to-face contact with the shoulder 6d of the hub 4 as well as with the outer race 10b of the first bearing 10. The inward flange 16 further provides a second abutment surface 16b axially coming into face-to-face contact with the outer race 11b of the second bearing 11. The two abutment surfaces 16a, 16b of the inward flange 16 are exactly parallel to each other, so that the two bearings 10, 11 are also maintained parallel to each other as long as the respective outer races 10b, 11b are held in face-to-face contact with the inward flange 16. Further, the two bearings 10, 11 are coaxial with each other and with the central shaft 2 which provides a common rotational axis A.

According to the illustrated example, a retainer ring 17 is arranged between the closure ring 7 and the first bearing 10. The retainer ring 17 is removably anchored in an engaging groove 18 formed in the outer surface of the central shaft 2 at one end thereof adjacent the closure ring 7. An elastic member 19 is interposed between the retainer ring 17 and the inner race 10a of the first bearing 10 to always urge the inner race axially inward for the purpose to be described later. In fact, the inner race of the first bearing is axially slidable on the central shaft.

Figure 3:
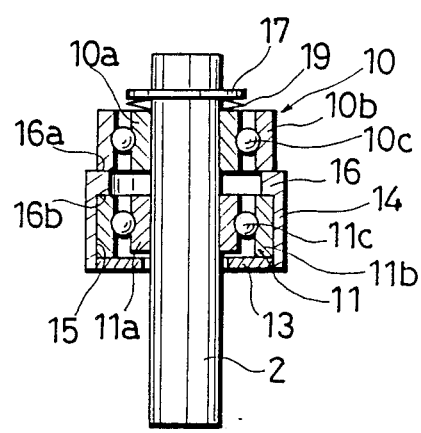
FIG. 3 is a front view showing a preassembled unit which is used to form the spindle motor of FIG. 1.
Figure 7:
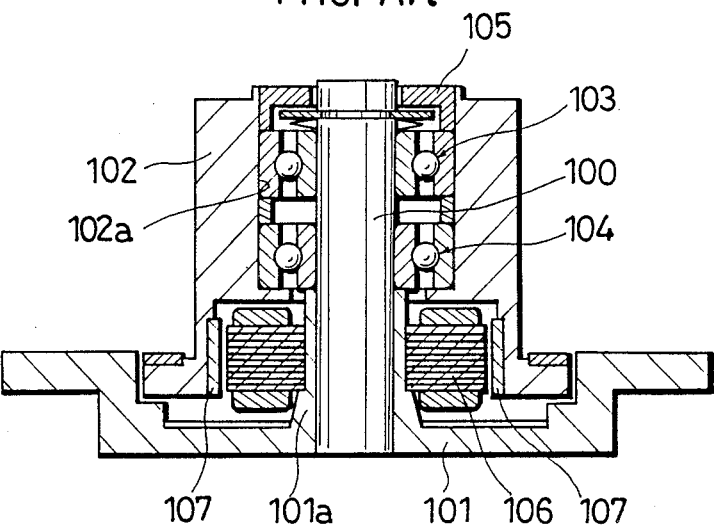
FIG. 7 is a front view, in vertical section, showing a prior art spindle motor.
Figure 8:
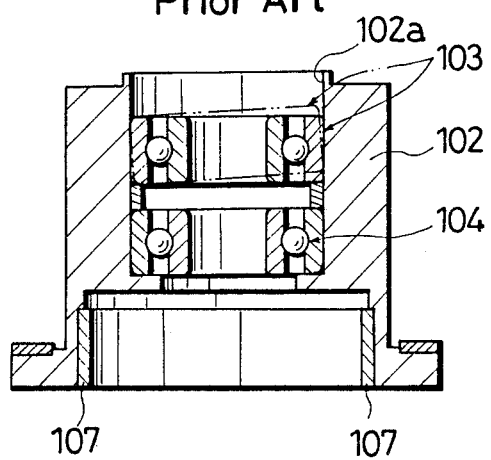
FIG. 8 is a front view, in vertical section, showing the process of assembling the prior art spindle motor.

Prior to completely assembling the spindle motor 1, the central shaft 2 and the two bearings 10, 11 are preassembled by using the auxiliary bush 14, as shown in FIG. 3. Such a preassembled body is prepared in the following manner.

First, the second bearing 11 is press-fitted into the mounting space 15 of the auxiliary bush 14 by using a pair of jigs 20, 21, as shown in FIG. 4a. The upper jig 20 has an annular projection 20a which comes into face-to-face abutment with the outer race 11b of the second bearing. The lower jig 21 has a central projection 21a surrounded by an annular surface 21b which comes into face-to-face abutment with the first abutment surface 16a of the auxiliary bush 14. The second bearing 11 may be properly press-fitted by axially pressing the upper jig 20 until the outer race 11b comes into uniform abutment with the second abutment surface 16b of the auxiliary bush 14, thereby establishing accurate positional relation between the second bearing and the auxiliary bush.

Subsequently, the second bearing 11 together with the auxiliary bush 14 is mounted to the central shaft 2 by using another pair of jigs 22, 23, as shown in FIGS. 4b and 4c. The lower jig 23 has a bottomed bore 23a in communication with an air relief port 23b. The bottomed bore 23a substantially corresponds in diameter to (in fact slightly larger than) the shaft 2 to snugly receive the latter (in an inverted condition) prior to mounting to the second bearing 11, as shown in FIG. 4b. The bore 23a has a depth X which is exactly dimensioned. The air relief port 23b facilitates insertion of the shaft into the bottomed bore. The upper jig 22 has a cylindrical projection 22a which comes into face-to-face abutment with the inner race 11a of the second bearing. The upper jig 22 further has a central through-bore 22b which slidably receives the shaft 2.

For mounting the second bearing onto the shaft 2 supported in the inverted condition by the lower jig (FIG. 4b), the bearing inner race 11a is fitted, from above, onto the shaft, and the upper jig 22 is fitted over the shaft to press the bearing inner race 11a downward until the first abutment surface 16a of the auxiliary bush 14 comes into face-to-face contact with the upper surface of the lower jig 23 (FIG. 4c). In so doing, a downward pressing force of about 2 kg is exerted onto the upper jig, so that an unacceptable load is not applied to the bearing parts, particularly the balls 11c, when the auxiliary bush 14 contacts the lower jig 23. Because the cylindrical projection 22a of the upper jig 22 presses only the bearing inner race 11a which is a part in frictional contact with the shaft 2, the bearing balls 11c are not subjected to any load during downward excursion of the bearing. Finally, the bearing inner race 11a is axially fixed to the shaft 2 by using an adhesive for example. As a result, the second bearing 11 is mounted to the shaft at an exact axial position which is determined by the depth X (FIG. 4b) of the bottomed bore 23a.

In the next step, the first bearing 10 is slidably fitted on the shaft 2 until its outer race 10b comes into face-to-face contact with the first abutment surface 16a of the auxiliary bush 14, as shown in FIGS. 4d and 4e. Subsequently, the elastic member 19 comprising a pair of conical springs 19a, 19b is arranged above the inner race 10a of the first bearing, and the retainer ring 17 is elastically fitted in the engaging groove 18 of the shaft. As a result, the outer race 10b of the first bearing is held pressed against the first abutment surface 16a of the auxiliary bush.

In the preassembled body thus obtained (FIG. 3), the first and second bearings 10, 11 are always kept precisely parallel to each other because the respective outer races 10b, 11b of these bearings are held in contact with the parallel abutment surfaces 16a, 16b of the auxiliary bush 14, as previously described. Further, because of such parallelism, the two bearings, which are already on the central shaft 2, are exactly coaxial with each other and with the shaft.

The preassembled body is inserted into the hub 4 in the manner shown in FIGS. 5a and 5b. This insertion process is conducted by utilizing a further pair of jigs 24, 25. The upper jig 24 has a circular recess 24a which is dimensioned to snugly receive an annular top projection 4b of the hub 4. The upper jig further has an air relief port 24b in communication with the circular recess 24a. On the other hand, the lower jig 25 has an annular projection 25a which is dimensioned to closely fit in the auxiliary bush 14 for face-to-face abutment with the outer race 11b of the second bearing 11. The lower jig 25 further has a central through-bore 25b designed to closely receive the shaft 2.

When the two jigs 24 are brought closer (see FIG. 5b) to each other, the first bearing 10 and the auxiliary bush 14 are properly inserted respectively into the first and second bore portions 6a, 6b of the hub 4 without inviting positional deviations. This is because of the following reasons.

(1) The auxiliary bush 14 combined with the urging force of the elastic member 19 functions to keep parallelism between the first and second bearings 10, 11 throughout the entire process of insertion.

(2) In the preassembled body (substantially an integral unit), the first bearing 10 and the auxiliary bush 14 provide a combined length L (FIG. 5a) which is much larger than the axial length of the individual bearings 10, 11. This combined length is enough to prevent inclined insertion or press-fitting which is likely to occur when the bearings are separately fitted (due to a small thickness or axial length of each bearing as described in connection with the prior art).

(3) The first bearing 10 never comes into frictional contact with the second bore portion 6b of the hub 4 during movement to a point for insertion into the first bore portion 6a of the hub because of the diametrical difference between the first and second bore portions 6a, 6b. This means that the second bore portion 6b of the hub is kept dimensionally intact before receiving the auxiliary bush 14.

(4) The first bearing 10 is inserted into the first bore portion 6a as the auxiliary bush 14 is inserted into the second bore portion 6b, meaning that press-fitting of the first bearing 10 and of the auxiliary bush 14 occurs almost simultaneously to provide two guiding portions for insertion. This is advantageous in preventing occurrence of inclination particularly at the initial stage of press-fitting which is the time when inclination is most likely to occur.

It should be further noted that the use of the jigs 24, 25 for insertion of the preassembled unit is effective for preventing the bearings 10, 11 from being subjected to objectionable loads during such insertion. More specifically, the annular projection 25a of the lower jig 25 comes into pressing contact with the outer race 11b only of the second bearing 11, so that an axial force required for press-fitting the preassembled unit will not tend to move the inner races 10a, 11a of the respective bearings 10, 11 axially relative to the outer races 10b, 11b.

As obviously appreciated, the reasons (3) and (4) described above are based on the specific arrangement in which the first and second bore portions 6a, 6b of the hub 4 are diametrically different. However, the reasons (1) and (2) are sufficient to prevent positional deviations between the two bearings 10, 11 (including the auxiliary bush 14) during the process of press-fitting. Thus, the first and second bore portions 6a, 6b of the hub may be constant in diameter, in which case the outer race 10b of the first bearing 10 is equal in outer diameter to the auxiliary bush 14. Further, the elastic member 19, though preferably provided, may be dispensed with because the first abutment surface 16a of the auxiliary bush 14 inevitably comes into pressing or face-to-face contact with the outer race 10b of the first bearing 10 upon forcible entry of the latter into the first bore portion 6a of the hub 4.

In the final stage of assembly, the shaft 2 of the preassembled unit (including the hub 4) is press-fitted into the boss portion 5a of the mount bracket 5 by utilizing still another pair of jigs 26, 27, as shown in FIGS. 6a and 6b. As shown, the upper jig 26 has a central recess 26a for snugly receiving the hub 4, and is provided with an air relief port 26b. The upper jig further has a central projection 26c which comes into pressing contact with the shaft 2. The lower jig 27 also has a central recess 27a for snugly receiving a correspondingly shaped bottom portion of the mount bracket 5.

Obviously, the stator 3 must be previously mounted on the boss portion 5a of the mount bracket 5, whereas the sealing ring 13 must be previously fitted into the auxiliary bush 14 into contact with the outer race 11b of the second bearing 11. Thus, when the two jigs 26, 27 are brought toward each other, the final spindle motor is obtained, as shown in FIG. 6b.

According to the present invention, the two bearings 10, 11 can be made exactly parallel to and coaxial with each other in the complete assembly of the spindle motor. Thus, the hub 4 may be rotated precisely as controlled without rotational deflections, thereby preventing errors in reading from or writing in each disc 8 (FIG. 1).

The present invention being thus described, it is obvious that the same may be varied in many ways. For instance, the elastic member 19 may be provided by a compression coil spring instead of the conical springs 19a, 19b (FIG. 4e). Further, the invention is also applicable to such a spindle motor as disclosed in U.S. Pat. No. 4,519,010 to Elsaesser et al, wherein a central shaft co-rotatable with a hub is rotatably supported in a mounting bore of a stationary member by a pair of bearings. Such variations are not to be regarded as a departure from the spirit and scope of the invention, and all such modifications as would be obvious to those skilled in the art are intended to be included within the scope of the appended claims.

We claim:
1. A spindle motor comprising:
   a central shaft;
   a hub rotatable bout said shaft, said hub having a central bore which is open at one end;
   means for drivingly rotating said hub about said shaft;
   a first bearing fitted in said bore to surround said shaft;
   a second bearing disposed within said bore to surround said shaft and axially spaced from said first bearing to be positioned closer to the open end of said bore; and
   an auxiliary bush fitted in said bore, said bush having a cylindrical wall defining a mounting space in which said second bearing is fitted, said bush having a radial inward flange axially interposed between said first and second bearings, said flange proving a first abutment surface in face-to-face contact with an outer race of said first bearing, said flange further providing a second abutment surface in parallel to said first abutment surface and in face-to-face contact with an outer race of second bearing.

2. The spindle motor as define in claim 1, wherein said central bore of said hub includes a first bore portion for fittingly receiving said first bearing, and a second bore portion for fittingly receiving said auxiliary bush, said second bore portion being larger in diameter than said first bore portion.

3. The spindle motor as defined in claim 2, wherein said first and second bore portions are bounded by an annular shoulder which is held in face-to-face contact with said first abutment surface of said flange of said auxiliary bush.

4. The spindle motor as defined in claim 1, wherein said first bearing has an inner race which is axially urged toward said said second bearing by elastic means.

5. The spindle motor as defined in claim 4, wherein said elastic means comprises a pair of conical springs interposed between said inner race of said first bearing and an engaging member fixed to said central shaft.

6. A spindle motor comprising:
   a central shaft providing a rotational axis;
   a hub rotatable about said axis;
   means for drivingly rotating said hub about said axis;
   a bearing accommodating bore defining an annular space around said shaft;
   a first bearing fitted in said bore to surround said shaft;
   a second bearing disposed within said bore to surround said shaft at a position axially spaced from said first bearing; and
   an auxiliary bush fitted in said bore, said bush having a cylindrical wall defining a mounting space in which said second bearing is fitted, said bush having a radial inward flange axially interposed between said first and second bearings, said flange providing a first abutment surface in face-to-face contact with an outer race of said first bearing, said flange further providing a second abutment surface in parallel to said first abutment surface and in face-to-face contact with an outer race of said second bearing.

* * * * *